A. O. SCHMOLINSKI.
PISTON RING.
APPLICATION FILED DEC. 8, 1920.

1,397,334.

Patented Nov. 15, 1921.

Inventor

Adolph O. Schmolinski,

By H. M. Plaisted,

Attorney.

UNITED STATES PATENT OFFICE.

ADOLPH O. SCHMOLINSKI, OF ST. LOUIS, MISSOURI.

PISTON-RING.

1,397,334.

Specification of Letters Patent.  Patented Nov. 15, 1921.

Application filed December 8, 1920. Serial No. 429,096.

*To all whom it may concern:*

Be it known that I, ADOLPH O. SCHMOLINSKI, a citizen of the United States, residing at St. Louis, State of Missouri, have invented certain new and useful Improvements in Piston-Rings, of which the following is a specification.

This invention relates to certain new and useful improvements in piston rings, the peculiarities of which will be hereinafter described and claimed.

The main object of my invention is to provide a piston ring that will adjust itself at certain points each side of the joint where usually contact is imperfect; and secondly, will provide flexibility at said points without loss of bearing surface at the top and bottom of the ring.

Figure 1:
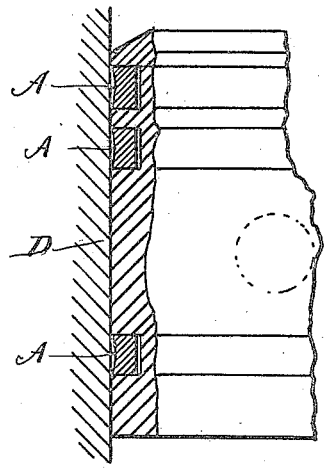
Figure 2:
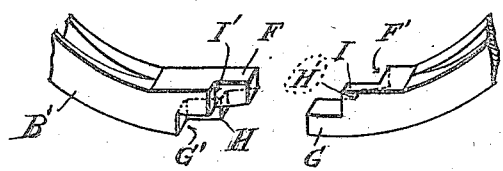
Figure 4:
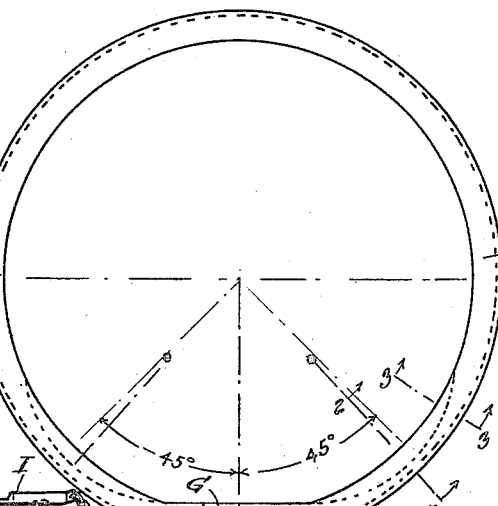
Figure 6:
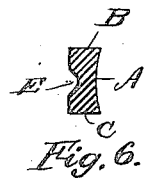
Figure 3:
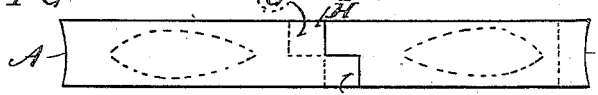
Figure 5:
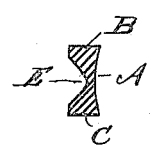

In the accompanying drawing on which like reference letters indicate corresponding parts, Figure 1 represents an elevation of part of a piston with the cylinder wall and adjacent portion of the piston in section, and piston rings exemplifying my invention mounted in the grooves of said piston; Fig. 2 a detail plan view of my piston ring compressed for mounting in the cylinder; Fig. 3 an outside edge view of the same at the joint; Fig. 4 a perspective view of the joint portions of said ring as separated, showing the inside face and the top face of the ring; Fig. 5 a cross section of the ring on the line 2—2 of Fig. 2; Fig. 6 a cross section of the ring on the line 3—3 of Fig. 2; and Fig. 7 a perspective of the joint portions of said rings, separated and showing the top and inner faces of the ring, and showing the matching faces as rotated 90 degrees so that the inside face of Fig. 4 becomes the top of Fig. 7.

In my practical experience replacing various designs of piston rings in pistons, I have found no ring that showed an even contact of all of its outer face with the cylinder wall, unless extraordinary finishing work was done upon the outside face to fit said face to a pre-determined size of cylinder. In all the usual make of piston rings, these non-bearing portions were sometimes located near the upper corner of the outer surface and sometimes near the lower corner. All of the designs showed the greatest amount of surface out of contact at points on the outer face of the ring that were 45 degrees or a little less on each side of the joint. This is due to the method of turning up the rings to a larger diameter than the cylinder and then cutting out a section at the joint so that the rings will tend to spring out against the cylinder wall when compressed in position. The ring at the joint is not therefore a true circle with the balance of the circumference, but is pointed, and these points at the joint bear on the cylinder wall and do not allow the same contact of ring and wall at the points substantially 45° from the point, as at the other parts of the circumference.

I have also found that the endeavors heretofore made in various designs of rings to overcome the lack of perfect contact at points about 45 degrees on each side of the joint have not been successful. Rings have been made eccentric with the thinnest radial dimension at the joint, in the endeavor to overcome this difficulty. Making the ring more flexible at such points 45° from the joint than at other points of the circumference, I have discovered will cause the ring to bear fully where previously it lacked good contact. In my ring I provide a flexibility at the points mentioned by means of a groove E cut out of the inner face of said ring in the form of a lune, the cross section of which is preferably triangular so that it will taper away to both points and provide the thinnest portion of the wall of ring at the point indicated by the section 2—2 of Fig. 2, which is slightly less than 45 degrees from the joint. The ends of the ring forming the joint are preferably thickened radially as shown in Fig. 2, so as to maintain the stiffness of the original section of the ring and even increase the stiffness. The joint used consists of overlapping tongues F and G that fit into corresponding recesses G' F'. A shoulder H at one side of the tongue Fig. 4, registers with a corresponding recess H' at the same side of the other tongue. The other tongue has a shoulder I opposite recess H', and a matching recess I' in the tongue of the other joint portion, which recess is opposite the shoulder H of the said tongue. The outer face A of the ring is preferably concave so it will fit readily against the wall D of the cylinder.

I have shown in Fig. 7 the same joint as in Fig. 4, but with the meeting faces rotated 90 degrees so that the inner face of Fig. 4 becomes the top face B' of Fig. 7. The overlapping tongues have a meeting face that is at right angles to the ring plane, but each tongue has a projecting shoulder and recess corresponding to the shoulder H and recess I' and to the shoulder I and the recess H' of Fig. 4 but rotated 90 degrees. It is preferred however to use the joint as arranged in Fig. 4 as it is believed to be better adapted to a piston ring.

I claim:

1. A piston ring having its minimum radial thickness at points substantially 45 degrees on each side of the joint and having its top and bottom faces unreduced at said points, to afford flexibility at said points while maintaining radial width of top and bottom faces for side bearing in the grooves of a piston.

2. A piston ring having a lune cut out of the inner face between the top and bottom faces and on each side of the joint, the greatest radial thickness of said lunes being located at points substantially 45 degrees from said joint.

3. A piston ring having lunes cut out of the inner face between the top and bottom faces on each side of the joint,—said lunes being triangular in cross section.

In testimony whereof I have affixed my signature.

ADOLPH O. SCHMOLINSKI.